Dec. 29, 1970　　W. J. EICH ET AL　　3,551,289
NUCLEAR REACTOR

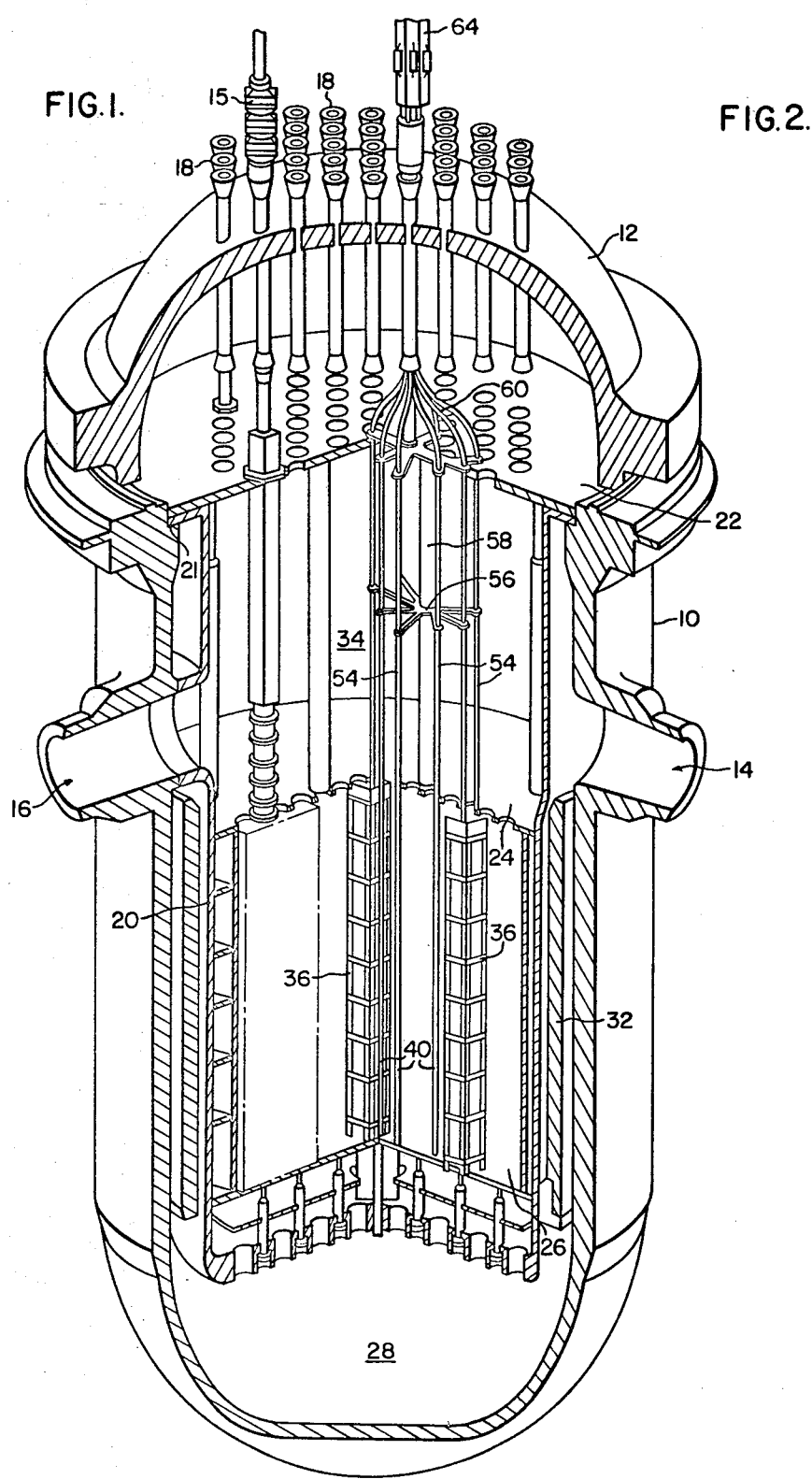

Filed Jan. 24, 1968　　4 Sheets-Sheet 2

United States Patent Office 3,551,289
Patented Dec. 29, 1970

3,551,289
NUCLEAR REACTOR
Walter J. Eich, Pittsburgh, George H. Minton and Harry N. Andrews, Monroeville, and Robert J. French, Pittsburgh, Pa., assignors to Westinghouse Electric Corporation, Pittsburgh, Pa., a corporation of Pennsylvania
Filed Jan. 24, 1968, Ser. No. 700,152
Int. Cl. G21c 7/08
U.S. Cl. 176—22                           7 Claims

ABSTRACT OF THE DISCLOSURE

A nuclear reactor is disclosed wherein a plurality of two-position control elements capable of producing localized or fine flux trim (FFT) are commingled with the fuel rods in such a manner as to substantially control the reactivity and power distribution of its core region at power and to supplement the principal control elements which are incrementally movable neutron absorber rods.

BACKGROUND OF THE INVENTION

This invention pertains to nuclear reactors, and more particularly to the control systems by which the neutron flux of such a reactor can be varied throughout the life of its reactive core.

Certain prior art control systems generally relied upon a combination of incrementally movable neutron absorbers and a generally diffused poison mixed with the moderator. The incrementally movable neutron absorbers took one of the following forms to control the flux distribution of the reactor core: (1) cruciform units containing the absorber material, (2) single control elements situated between selected fuel assemblies, (3) single absorber rods located at the center of selected fuel assemblies, or (4) a plurality of clustered or grouped poison elements operable as a unit and associated with selected fuel assemblies and called rod cluster control (RCC).

These control units are of a material of high neutron capture cross-section and are each coupled to mechanisms which incrementally lower or raise the control units relative to stationary fuel assemblies so as to respectively absorb more or fewer neutrons.

The diffuse poison generally used in boric acid dissolved in the reactor coolant which is used to lower the overall multiplication factor of the core during its most reactive cycles.

A major problem in such systems of the prior art is that this system inherently produces a skewed or non-uniform axial flux distribution. If the control element is incrementally lowered into the reactive core from one extremity of the core, e.g., from the top of the core, it tends to depress the flux distribution at the top of the core while leaving the distribution at the bottom of the core at its previous level. This generally requires the addition of a chemical shim control system, such as the boric acid mentioned above, to improve the overall power distribution of the core. In other words, it is the bulge at the side of the core opposite the side of entry of the control unit that forms limiting criteria for the operation of the prior art nuclear reactors. This bulge also invariably results in a greater burn-up of a portion of the reactive material and insufficient burn-up of a portion of the remainder of the material.

The axial flux distribution is also affected by the axial thermal gradient. Since coolant is heated as it flows upwardly through the core, this gradient produces a less dense coolant at the top of the core while leaving the density at the bottom of the core at a higher value. Since the number of thermalized neutrons depends upon the density of the coolant, it is clear that more thermalized neutrons are created adjacent the bottom of the core than adjacent the top. This factor also tends to raise the power density at the bottom of the core further aggravating the flux bulge problem created by the incremental neutron absorbers.

The power level that may be safely sustained is also affected by the radial flux distribution. A number of flow channels may be expected to be at a higher temperature or "hot" relative to the average channel temperature. The creation of such "hot channels" can be the result of the distance of such channels from the control elements, channel sizes which create flux peaking therein, and variations in fuel enrichment from zone to zone, as well as other factors. The positions of such "hot channels" changes during burn-up and are not satisfactorily predictable. Chemical shimming has generally been used to attempt to solve this problem also. However, since chemical shimming comprises a substantially admixture of neutron absorber in the coolant, it is not as effective in correcting the power pattern as would a non-uniform addition determined on the basis of the actual neutron flux distribution. In accordance with the invention, in large reactors, the sensitivity of the flux distribution to the additional absorber is such that low worth absorbers (FFT) are needed in order to provide an optimum correction to the power pattern.

Further, as the reactors tend to increase in size more and more incrementally movable neutron absorbers are necessary to control excess reactivity built into the reactor cores. These incrementally movable control elements are attached to expensive mechanisms, and the addition of each additional control structure results in an additional mechanism along with expensive indicating and electrical control means and raises the overall cost of the power plant by a large factor.

SUMMARY OF THE INVENTION

This invention solves the aforementioned problems of prior art nuclear reactors by utilizing a relatively large number of two position fine flux trim rods to supplement incrementally movable rod cluster control rods. In accordance with the invention, during operation some of the fine flux trim rods are fully withdrawn from the core. Concurrently, all of the rod cluster control rods are substantially removed from the core. Slight variations in flux are now controllable solely by the fine flux trim rods and the primary incrementally moveable control rods are used only to shutdown the reactor or under emergency conditions. Thus for all intents and purposes, the two-position fine flux trim rods are the sole means relied upon to control the reactivity and power distribution of the reactor core at power.

Since the fine flux trim rods are either completely inserted or completely removed from the reactor core the axial flux bulge associated with partial insertion of the usual incrementally movable control elements is in the main eliminated. Thus with the present invention an important limiting criterion for overall power operation has been obviated.

The additional axial flux bulge due to the thermal gradient across the core is a minor problem when compared with the bulge due to partial insertion of a control rod, but this problem may also be eliminated utilizing the fine flux trim technique by providing a plurality of partial length rods, that is, rods with the neutron absorber portion only at their bottom.

The hot channel problem may be substantially decreased by the further spreading of the neutron absorbing material throughout the core through the use of fine flux trim rods rather than concentrating it at selected locations as is achieved by the main control rods. The operator of a nuclear power system may thus insert one or more fine flux trim rods in regions where a hot channel is sensed or a high radial flux density is determined to exit. In large reactors, the sensitivity of the power distribution to the addition of neutron absorbing material is such that conventional control rods such as cruciform or RCC assemblies would introduce too great a pertubation with a substantial localized effect. Fine flux trim elements, properly distributed, constitute a significant new capability both in the flexibility and magnitude of control.

It is to be further noted that inasmuch as all of the fine flux trim rods are two position rods, the complex mechanisms associated with incrementally movable control rods need not be used. Several trim rods may be connected to a single two-position mechanism. The structural arrangement and mechanism for accomplishing this end is a subject of a copending application Ser. No. 700,253 (WE 38,658) filed concurrently herewith in the names of E. Frisch, H. Andrews, and H. Braun for a Nuclear Reactor Control Device and assigned to the present asignee. The fine flux trim rods may be affixed by flexible suspension elements to pistons which can either hydraulically or electromechanically be raised to an upper position where selected rods can be electromechanically held while the remainder are allowed to fall or are lowered under the influence of gravity into the core. This feature allows the association of the fine flux trim rods from several fuel assemblies with a single mechanism.

This novel fine flux trim system would yield from 10 to 20 percent more power under the identical fueling conditions of the corresponding present day control rod systems.

DESCRIPTION OF THE DRAWINGS

FIG. 1 comprises an isometric view, partially in section, showing a reactor including the fine flux trim system of this invention.

FIG. 2 is an expanded view of a guide tube cut-away to show a fine flux trim rod.

DESCRIPTION OF THE PREFERRED EMBODIMENT

Figure 4:
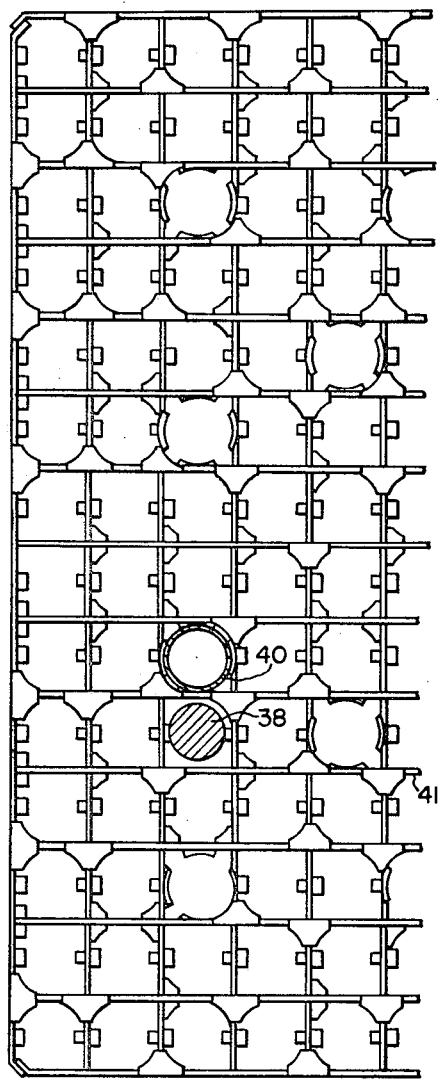
FIG. 4 is a plan view of a grid arrangement of a fuel assembly suitable for use with rod cluster control or fine flux trim.

Referring to FIG. 1, there is illustrated a power producing nuclear reactor of the central station type incorporating the fine flux trim system of this invention. A pressure vessel 10 is shown which forms a tight pressurized container when sealed by head assembly 12. The pressure vessel 10 has coolant flow inlet means 14 and cooling flow outlet means 16 in the walls thereof. The head assembly 12 is secured to vessel 10 by suitable means, not shown, and has a plurality of head penetration adapters 18 sealed in and through its substantially hemispherical wall. The axis of the head penetration adapters 18 are aligned in parallel with the axis of the pressure vessel 10. A core barrel 20 is supportedly suspended from an inwardly extending shoulder 21 just below the top of the pressure vessel 10. An upper support plate 22, an upper core plate 24, and a lower core plate 26 are each supportedly mounted to extend across the core barrel 20. Coolant flow entering through inlet 14 proceeds to the bottom coolant manifold 28 through a flow annulus 30 formed by the lower walls of the pressure vessel 10 and a core barrel 20. The flow annulus 30 desirably contains a thermal shield 32. From the bottom manifold 28 the flow proceeds generally axially upward through the area between the core plates 24 and 26 to an upper manifold region 34 from which it then proceeds through the outlet 16 to energy conversion structure (not shown). The region between the upper core plate 24 and the lower core plate 26 is filled with a plurality of removable fuel assemblies 36 all of which are substantially identical.

Figure 3:
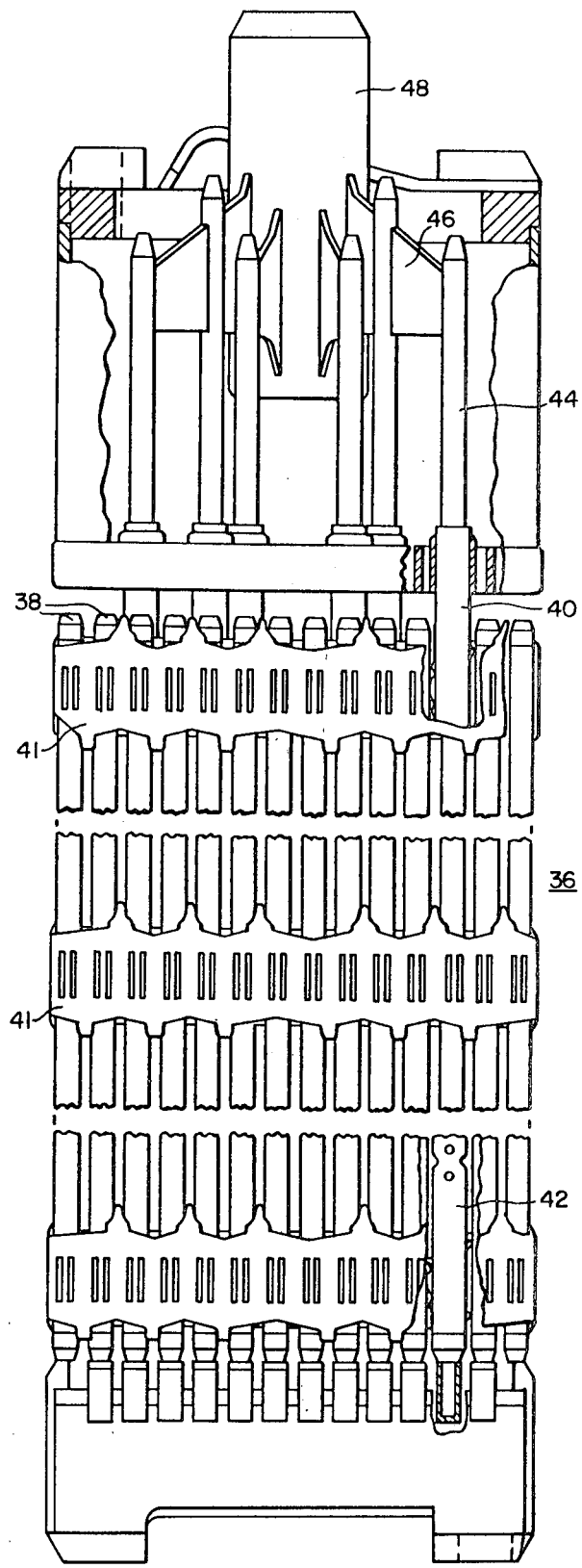
FIG. 3 is an elevation view, partially in section of a fuel assembly having a rod cluster type control rod therein.

One example of fuel assemblies 36 mounted in parallel array within the reactor core as shown in FIG. 1 is shown in greater detail in FIGS. 3 and 4. In this example each fuel assembly 36 includes a plurality of fuel rods 38 and a plurality of guide tubes 40 interspersed therebetween and held in a fixed relationship, each to the other, by an egg crate type structure 41. This type of fuel assembly is shown and described in greater detail in a copending application No. 552,976 filed on May 25, 1966 by R. Creagan and E. Frisch for a Fuel Assembly for Nuclear Reactors, and assigned to the present assignee. Where this type of fuel assembly is used with the invention the guide tubes 40 may serve as receptacles for rod cluster control units 42 or as convenient receptacles for the fine flux trim rods 52, to be described.

A typical fuel assembly 36 may comprise a 180 fuel rod 38 with 16 guide tubes 40 interspersed therebetween. Approximately one hundred and fifty fuel assemblies 36, by way of example, could comprise a reactor core capable of producing substantial power for central station electrical power plant applications. According to this invention, fuel assemblies would have primary control means which in this embodiment comprise a predetermined number, for example forty-five rod control clusters associated therewith. It is to be understood that the particular array of fuel assemblies having rod cluster control would be determined by the physics properties of a particular reactor. The array of fuel assemblies and primary control means would generally be symmetric and uniform with respect to the vertical center line of the nuclear core. Spaced among and about the fuel assemblies 36 having primary or shutdown rod cluster control associated therewith would be a plurality of fuel assemblies 36 having fine flux trim rods 52 adapted to be inserted and withdrawn from their guide tubes 40. One to four such fine flux trim rods 52 may be associated with particular ones of the aforementioned fuel assemblies, as will be explained.

The primary or shutdown control structure will now be briefly described for purposes of comparison with the description of the fine flux trim structure to follow. A more detailed description may be found in the aforementioned copending application to Creagan and Frisch. It should be clear, however, that according to this invention the primary or shutdown control would only be utilized during startup, shutdown, and emergency periods. During other periods of normal operation, fine flux trim would be used, as its name implies, to trim the flux distribution only in discrete areas of the reactor core adjacent each trim rod. The primary control units 42 are held in guide-ways or guide tubes 40 and are extended beyond the fuel rods 38 so that the extension portion 44 may be fixed to a spider 46 which is in turn fixedly attached to a lead screw 48. Thus each primary control unit 42 in this example includes 16 control fingers each secured to spider 46 and movable only as a group upon movement of spider 46. The lead screw 48 extends through the head penetration adapters to a mechanism 50 (only the outward configuration of which is shown in FIG. 1). Mechanism 50 normally is of a relatively complicated construction one example of which is described in detail in Pat. No. 3,158,766 issued Nov. 24, 1964 by E. Frisch for a Gripper Type Linear Motion Device, and assigned to the present assignee. It is designed to lift and lower the rod cluster control rods 42 in small increments on the order of ⅜ to ⅝ of an inch for each lift or lowering cycle. The individual primary control fingers or units 42 may thus be seen to be much like the fine flux trim rods 52 in outward configuration although they may be constructed of a material having higher neutron absorbing capabilities. The primary difference being that all of the rod cluster control units 42 associated with the single assembly are raised and lowered as a unit to incremental axial positions along the reactor core while the fine flux trim members are individually movable only to all-in all-out extreme positions.

As pointed out above the fine flux trim rods 52 are two position rods each adapted to be raised individually completely out of the core or inserted completely into the core. As shown in FIG. 1 for the purpose of facilitating the description of an embodiment of this invention, several guide tubes 40 have been illustrated as separate from their associated fuel assemblies 36 and expanded with fine flux trim rods 52 therein. One such guide tube 40 and fine flux trim rod 52 is shown in FIG. 2. The upper portion of guide tubes 40, which are to be used as receptacles for the fine flux trim rods 52, are joined to lower guide-ways 54 located between upper core plate 24 and upper support plate 22. The lower guide ways 54 are aligned with and are essentially extensions of guide tubes 40. A spider 56 rigidly affixed to support column 58 may be employed to prohibit lateral movement of the lower guide ways 54. Above the upper support plate 22, curved guide channels 60 are provided to form extensions of the lower guide ways 54. The lower ends of the curved guide channels 60 are aligned with and affixed to the upper ends of the lower guide ways 54, and the upper portions of the curved guide channels 60 may be aligned with and affixed to fine flux upper guide ways (not shown) which extends a substantial distance into the head penetration adapters 18.

Supported on some of the head penetration adapters 18 are fine flux trim lifting and lowering mechanisms 64. The mechanisms 64, as shown, are adapted to raise and lower eight individual fine flux trim rods 52. Since fine flux trim mechanism 64 is of a considerably simpler structure than conventional mechanisms 50, the cost appreciation is substantially less than the cost savings due to the increased power possible by this arrangement. FFT mechanism 64 is shown in greater detail and its operation described in the copending application of E. Frisch, H. Andrews, and H. Braun as aforementioned.

The individual fine flux trim rods 52 are of substantially the same neutron absorbing configuration as the individual control units 42. The rods 52 and individual units 42 may comprise silver-indium-cadmium absorbers clad with stainless steel.

The neutron absorptivity of a single rod 52 is so calibrated that insertion of one such rod will not greatly reduce or change the power distribution of the entire core as would the insertion of a rod cluster control rod. However a single rod 52 would have enough neutron absorptivity to incrementally reduce the reactivity of its substantially immediately surrounding fuel elements. The trim rods 52 are further designed to be either completely inserted or completely withdrawn from the core. This is only possible because of the above calibration of worth.

The majority of the trim rods 52 are approximately equal in length to the fuel rods 38. Thus, the region between the upper support plate 22 and the upper core plate 24 must be of a sufficient length to allow for full retraction of these rods. However some of the trim rods 52 may be of a partial length to compensate for the varying density of thermalized neutrons due to the varying density of the coolant as it passes upwardly through the nuclear core.

The particular placement of the fine flux trim rods 52 will depend upon the physics of each reactor with which they are to be used. In general, because each mechanism 64 can control a plurality of individual fine flux trim rods (eight as shown) a fairly wide and flexible dispersion can be achieved at relatively little additional cost. Further, a wide dispersion is desirable since the suppression of even small flux peaks can result in substantial savings.

Figure 5:
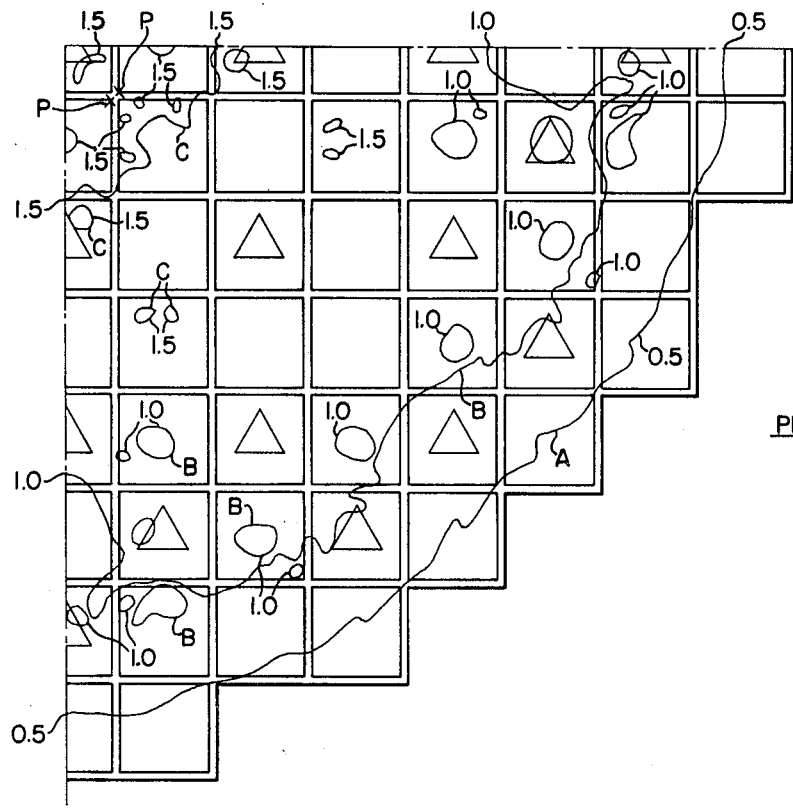
FIG. 5 is a schematic view of a radial section of a reactor core showing the flux distribution in a quadrant of the prior art reactor and having its flux peaks in the center region.
Figure 6:
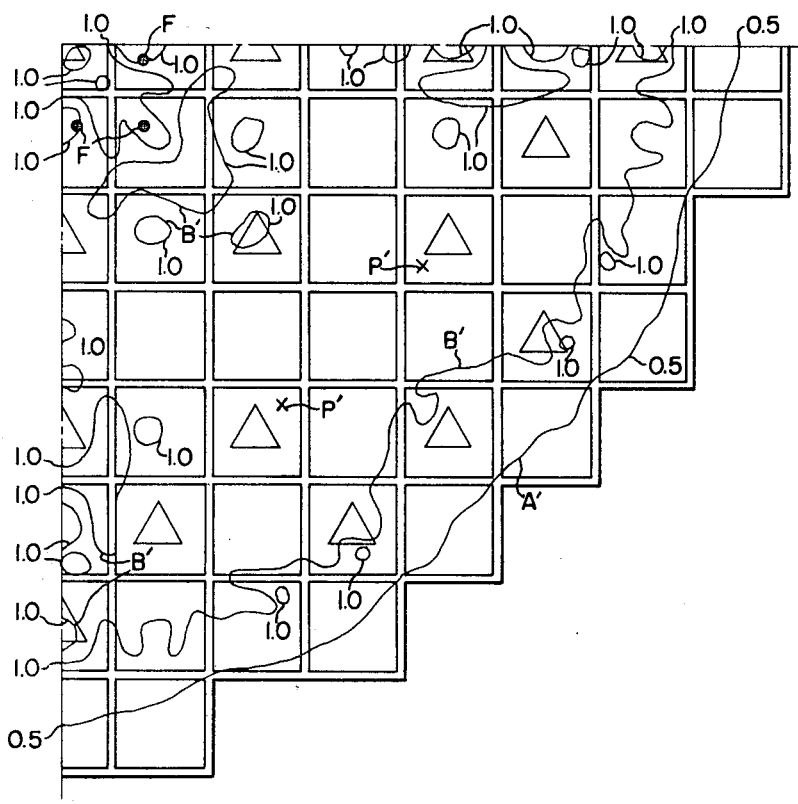
FIG. 6 is a view similar to FIG. 5 and illustrating the flux distribution thereof when trimmed in accordance with this invention.

Two examples of the application and use of fine flux trim rods will be given to exemplify the operation of this invention:

FIGS. 5 and 6 show the flux configuration of a center peaking reactor. FIG. 5 is a view of the prior art core arrangement having no fine flux trim means while FIG. 6 is a view of the same core arrangement having fine flux trim means usable therewith. In both figures the reactor is assumed to be at power with all of the primary or shutdown control rods withdrawn. Triangles are shown in these figures to indicate those assemblies which have a primary control assembly associated therewith. The dots F in FIG. 6 indicate the insertion of a fine flux trim rod at that location.

As can be seen in FIG. 5, wherein all of the primary control rods and no fine flux trim rods 52 are provided, the flux distribution proceeds from a unitless ratio value of 0.5 (1.0 being chosen to represent the average value) at the outside of the core to a value of 1.5 at the center of the core. Curve A represents the locus of points having a value of 0.5. Curves B and C respectively for loci of points having values of 1.0 and 1.5. Dispersed flux peaks higher than 1.5 may be noted with the highest peak value at points P reaching 1.798.

FIG. 6 shows the same reactor with twelve fine flux trim rods inserted (three per quarter-section) about the center of the core. The flux distribution has been radically changed such that it now proceeds from a value of 0.5 (Curves A' form the locus of such points) at the outside to a value of 1.0 (Curves B') at the center. Dispersed peaks P' higher than 1.0 occur here also, but the highest peak in this example has diminished in value to 1.476. These peaks could be further depressed by inserting additional fine flux trim rods in the adjacent fuel assemblies so as to reduce all of the peaks above 1.0 if desired, but the example was constructed to illustrate the rather startling configuration resulting from the insertion of only 12 strategically located fine flux trim rods.

Figure 8:
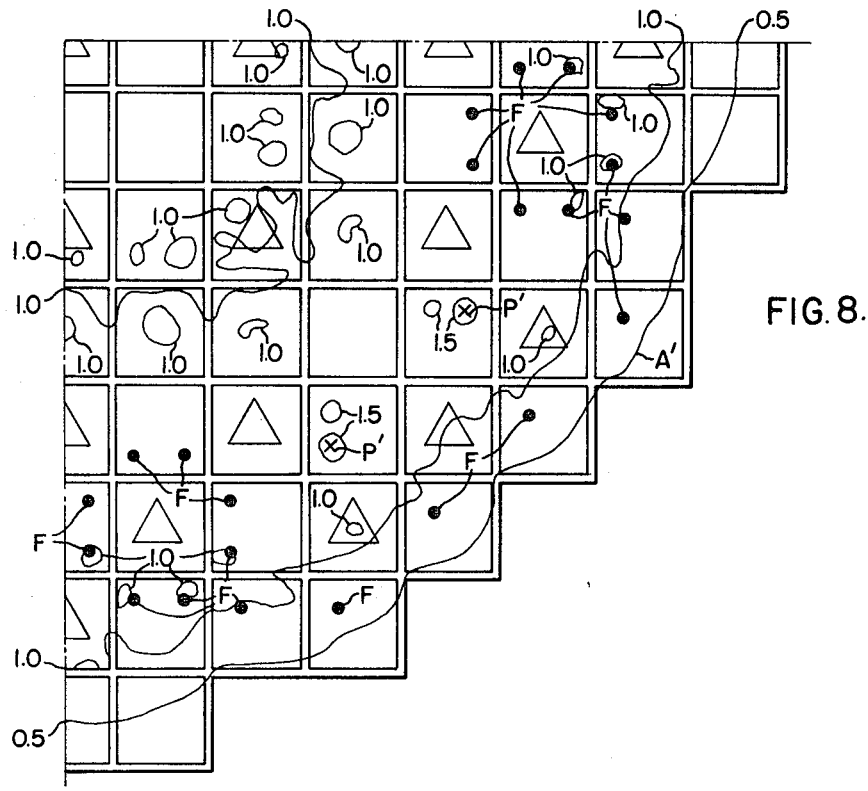
FIG. 8 shows the reactor core of FIG. 7 and illustrates the flux distribution thereof when trimmed in accordance with this invention.
Figure 7:
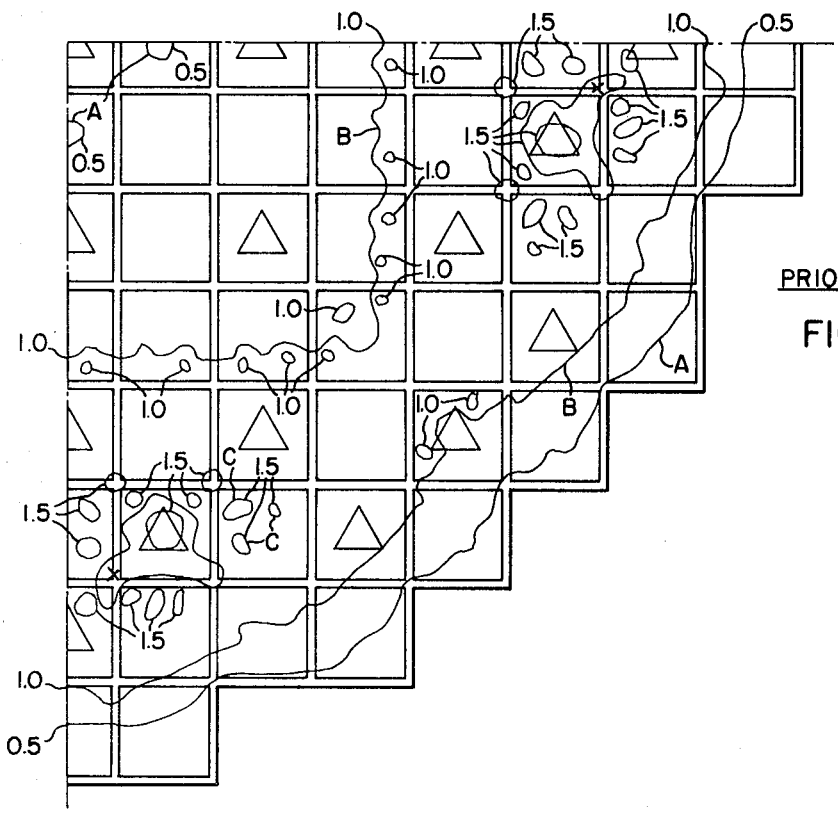
FIG. 7 is a view similar to FIG. 5 of a reactor core of the prior art and showing the flux distribution of an outside-peaking reactor.

In the second example of FIGS. 7 and 8, which use the identical symbols of FIGS. 5 and 6, respectively, the reactor core contains fuel distribution such that the peaks are closer to the periphery of the core. When contrasting FIG. 7 with FIG. 8, it is immediately seen that insertion of fine flux trim members F achieves a substantial improvement in flux leveling. It will be realized the few peaks P' of FIG. 8 above 1.0 could also be eliminated by additional insertions of trim rods F.

From the above examples, it should be noted that the placement of fine flux trim rods varies from fuel assembly to fuel assembly, and that as exemplified a maximum of 2 FFT rods are inserted in any one fuel assembly of the reactor core of this example. Other situations, however may require a large number of insertions. In accordance with the invention, fine flux trim rods 52 are used to suppress the high flux regions rather than partially inserted clustered rods 42. The partial insertion of the shutdown rods results in a reduction of the power density of large regions of the core. Similarly the use of additional diffused poison in the coolant results in a substantially uniform lowering of the flux level across the entire core.

It will, therefore, be apparent that there has been disclosed a fine flux trim system which enables a nuclear reactor to be controlled more simply and at a higher level of efficiency due to the inherent capability of this system to render the power density distribution more uniform through selective use of neutron absorbing material to suppress non-uniformities in the flux distribution. Further, certain nuclear reactors are now cyclically refueled, i.e., the core is divided into two or more generally circular or annular regions and these regions are sequentially replaced with fresh fissionable material. In other words, the core is usually producing power from several regions which contain varying amounts of fissionable material. Since the fuel assemblies, according to this invention, are all capable of receiving either the primary incremental control system or the fine flux trim system, the arrangement of these control systems may be changed to compensate for flux disturbances due to cyclic refueling, or the position of a particular fine assembly may be varied without concern for the control system to be associated with it in its new position.

We claim:

1. A nuclear power reactor comprising, in combination, a pressure vessel having coolant inlet and outlet openings therein, an upper plenum and a lower plenum within said vessel and having a reactor core fixedly positioned therebetween, said reactor core comprising a plurality of removal fuel assemblies, each fuel assembly comprising discrete elements of fissionable material and coolant flow channels between adjacent fuel elements, means in each fuel assembly for allowing the ingress of neutron absorbing control means into the assembly, one portion of said fuel assemblies having incrementally movable control means insertable therein, and a second portion of said fuel assemblies having trimming control means insertable therein, said trimming means being movable only to a first predetermined position and to a second predetermined position.

2. The nuclear power reactor of claim 1 wherein said incrementally movable control means are so arranged and constructed as to capture a relatively large number of neutrons, and said two-position control means are so arranged and constructed as to capture a relatively small number of neutrons.

3. The nuclear reactor of claim 1 wherein each of said fuel assemblies include a plurality of fuel rods containing fissionable material and a plurality of guide tubes for said control means, a plurality of neutron absorbing control means adapted to be telescoped within said control means guide tubes, some of said control means including a plurality of spaced neutron absorbing members attached to a common header to form a control unit, fuel assemblies in said one portion of said core receiving one of said control units therein, said control units being incrementally positionable as a cluster relative to each of said last-mentioned fuel assemblies, and trimming control means comprising a plurality of neutron absorbing trimming members, each of said trimming members being sized to be received within one of said guide tubes, means for moving said trimming members to either a fully-inserted or fully withdrawn position relative to said core, and at least some of those guide tubes located in said second core portion receiving said individually movable all in-all out trimming members.

4. In a pressurized nuclear power reactor having a reactor core located in a pressure vessel, said reactor including a first group of incrementally movable neutron absorbing control members insertable into selected fuel assemblies of said core and a second group of two position individually movable neutron absorbing trim elements insertable into other fuel assemblies and movable only to a fully inserted or fully withdrawn position relative to said fuel assemblies, said reactor having a heat exchange coolant for removing heat from said reactor core, the method of controlling said reactor to achieve increased total power while minimizing localized flux peaking comprising the steps of incrementally moving said first group of control members at least partially out of said selected fuel assemblies to achieve reactor operation at a predetermined power level, determining the flux levels in different regions the reactor core to identify flux peaks therein, inserting at least one of said trim elements into said other fuel assemblies at a position adjacent the flux peak to suppress the latter, and selectively inserting and withdrawing predetermined ones of said trimming elements to selectively suppress and increase neutron flux levels in localized regions of said reactor core throughout the lifetime of said reactor core.

5. The method of claim 4 including the step of adding a soluble neutron absorbing material to the coolant.

6. The method of claim 5 including the step of varying the concentration of the soluble material in the coolant at predetermined times during reactor core lifetime.

7. The nuclear power reactor of claim 1 wherein said control means are elongated rod-like members insertable in said coolant flow channels, said pressure vessel including top mounted sealed mechanisms thereon, means within said mechanisms for driving said control members into and out of said fuel assemblies and connecting means connecting said driving means with said control members.

References Cited

UNITED STATES PATENTS

| | | | |
|---|---|---|---|
| 2,967,809 | 1/1961 | Reed | 176—36 |
| 3,264,952 | 8/1966 | Winders | 176—36 |
| 3,314,859 | 4/1967 | Anthony | 176—35 |
| 3,347,747 | 10/1967 | West et al. | 176—35 |
| 3,390,052 | 6/1968 | McDaniels, Jr. | 176—35 |

CARL D. QUARFORTH, Primary Examiner

H. E. BEHREND, Assistant Examiner

U.S. Cl. X.R.

176—35, 36, 86